(12) United States Patent
Konno

(10) Patent No.: US 7,999,555 B2
(45) Date of Patent: Aug. 16, 2011

(54) MULTI-CHANNEL MEASURING APPARATUS FOR CONNECTION TO A FUEL CELL STACK

(75) Inventor: Norishige Konno, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 522 days.

(21) Appl. No.: 12/300,146

(22) PCT Filed: May 24, 2007

(86) PCT No.: PCT/JP2007/060586
§ 371 (c)(1),
(2), (4) Date: Nov. 10, 2008

(87) PCT Pub. No.: WO2007/145062
PCT Pub. Date: Dec. 21, 2007

(65) Prior Publication Data
US 2009/0146662 A1      Jun. 11, 2009

(30) Foreign Application Priority Data
Jun. 13, 2006   (JP) .................................. 2006-163229

(51) Int. Cl.
*G01N 27/416* (2006.01)
(52) U.S. Cl. ........................................ 324/434; 324/425
(58) Field of Classification Search .................. 324/425
See application file for complete search history.

(56) References Cited

FOREIGN PATENT DOCUMENTS
JP     2004-079195 A    3/2004
JP     2004-303621 A    10/2004

*Primary Examiner* — Thomas Valone
(74) *Attorney, Agent, or Firm* — Kenyon & Kenyon LLP

(57) ABSTRACT

A number and a combination of N-pole connectors and (N+1)-pole connectors are determined such that a number of fuel cells included in the fuel cell stack and a number of all of poles included in the plurality of terminal-side connectors are equal to each other. Further, when the number of fuel cells of the fuel cell stack changes, the change can be addressed by changing the number and the combination of the N-pole connectors and the (N+1)-pole connectors without newly providing a terminal-side connector other than the N-pole connector and the (N+1)-pole connector.

9 Claims, 4 Drawing Sheets

[FIG. 1]
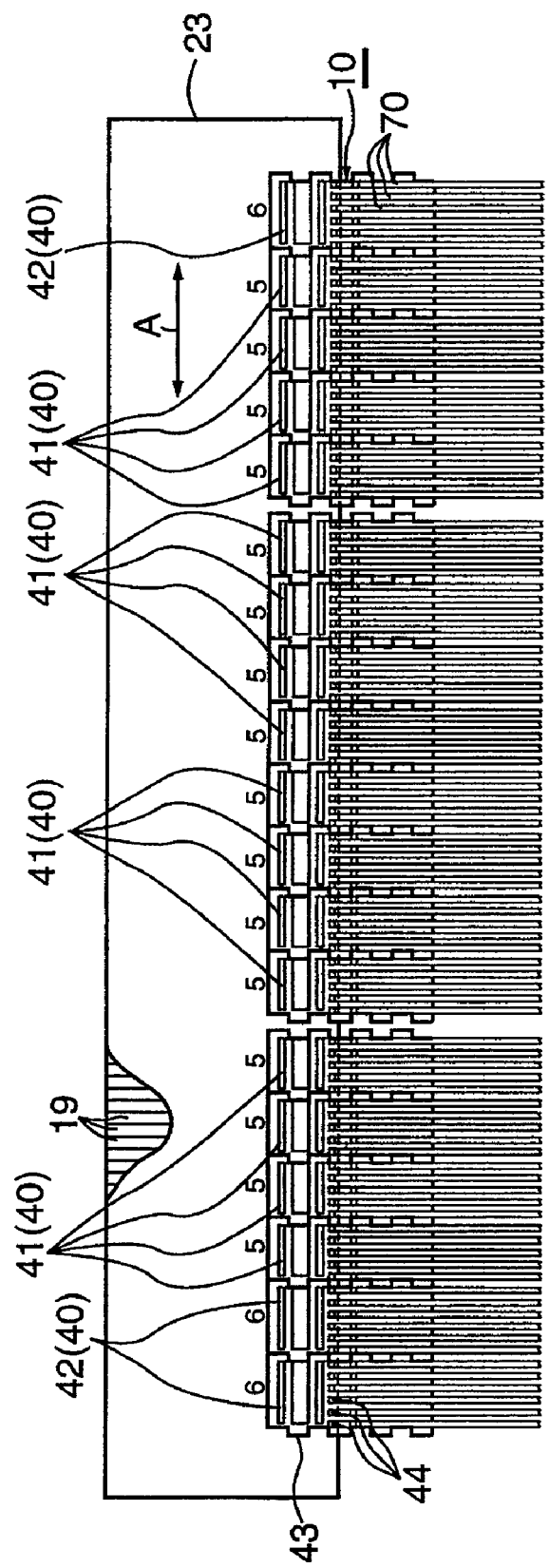

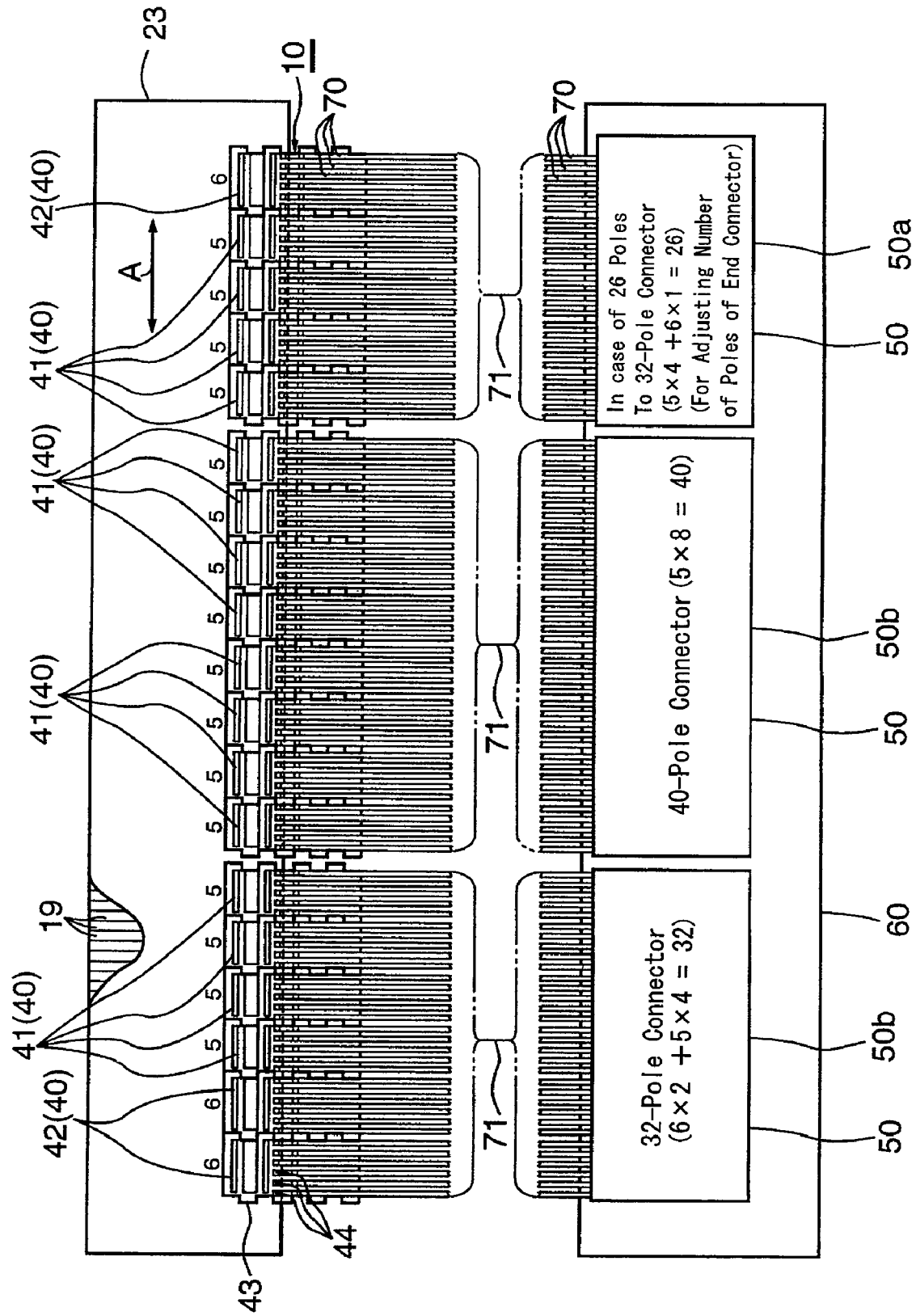

[FIG. 3]
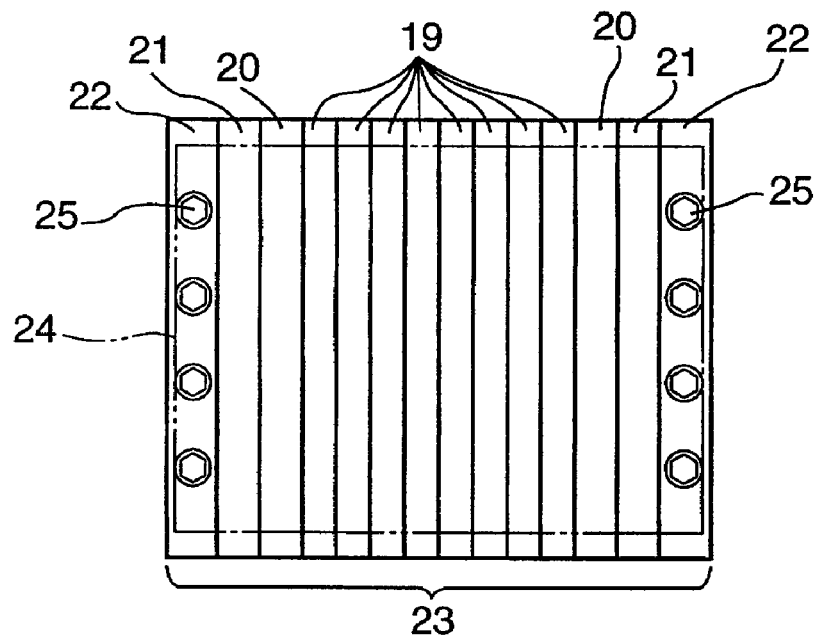
[FIG. 4]
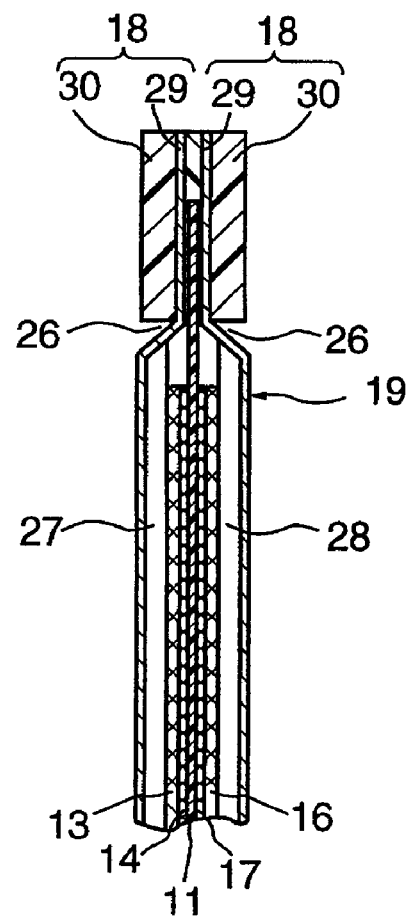

[FIG. 5]
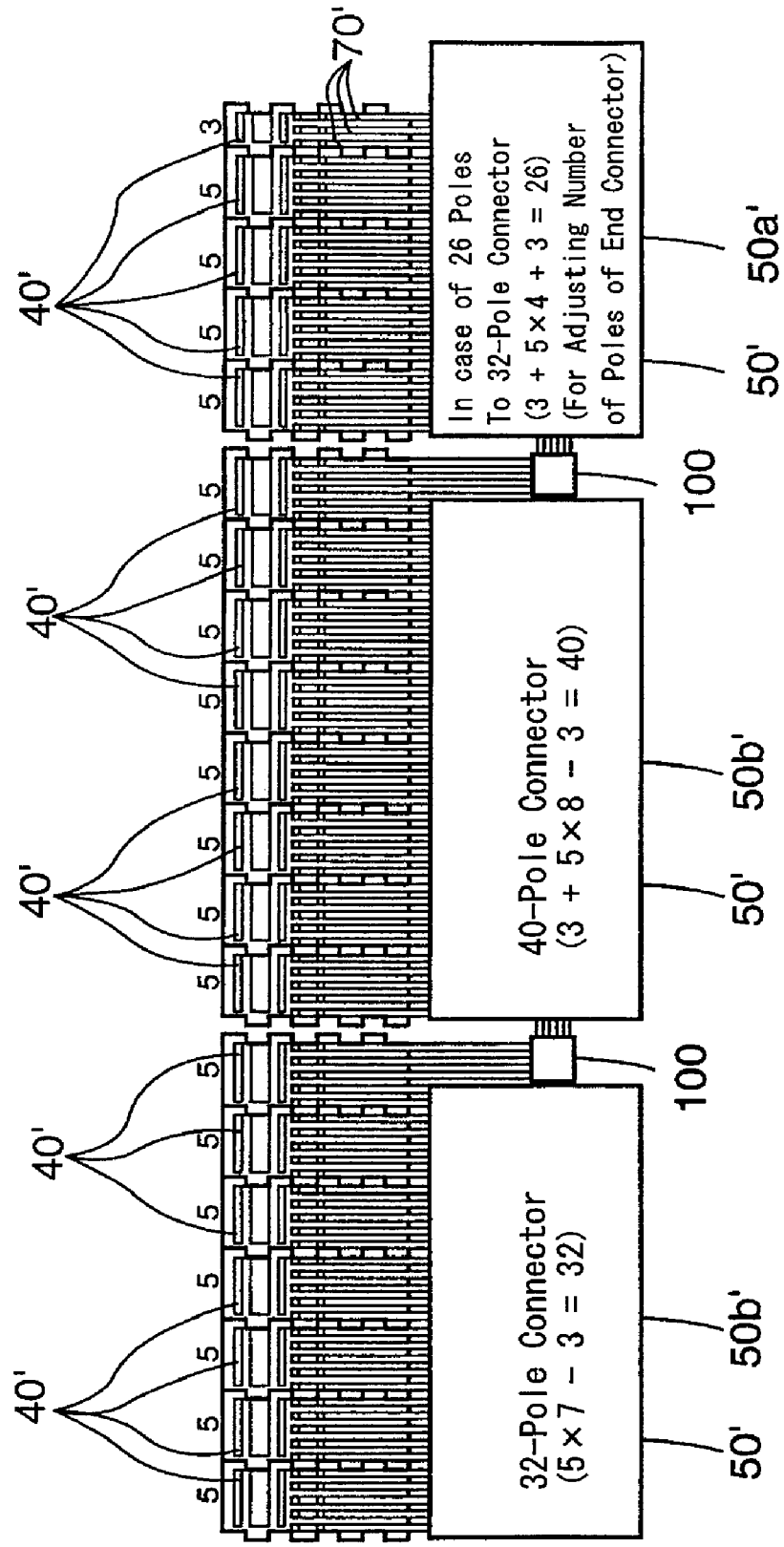

MULTI-CHANNEL MEASURING APPARATUS FOR CONNECTION TO A FUEL CELL STACK

This is a 371 national phase application of PCT/JP2007/060586 filed 24 May 2007, which claims priority of Japanese Patent Application No. 2006-163229 filed 13 Jun. 2006, the contents of which are incorporated herein by reference.

FIELD OF THE INVENTION

The present invention relates to a multi-channel measuring apparatus for connection to a fuel cell stack.

BACKGROUND OF THE INVENTION

Japanese Patent Publication 2005-79195 discloses a multi-channel measuring apparatus for connecting to a fuel cell stack. The apparatus disclosed in the publication is provided with two types of terminal-side connectors different from each other in number of poles. The number of poles of the terminal-side connector of a second type is designed to be equal to or greater than the number of extra fuel cells when the terminal-side connectors of a first type are connected to fuel cells of the fuel cell stack and is designed to be smaller than the number of poles of the terminal-side connector of the first type.

However, there are the following problems with the conventional multi-channel measuring apparatus for connecting to a fuel cell stack:

(a) When the number of poles of the terminal-side connector of the second type is designed to be greater than the number of the extra fuel cells when the terminal-side connectors of the first type are connected to fuel cells of the fuel cell stack (i.e., when there are poles not connected to the fuel cells of the fuel cell stack in the terminal-side connector of the second type), due to the extra poles of the terminal-side connector of the second type, the terminal-side connector of the second type is partially of no use and causes a disadvantage in the multi-channel measuring apparatus with respect to space.

(b) When the number of poles of the terminal-side connector of the second type is designed to be equal to the number of the extra fuel cells when the terminal-side connectors of the first type are connected to the fuel cell of the fuel cell stack, there is no extra pole not connected to the fuel cells of the fuel cell stack in the terminal-side connectors of the second type. However, since the pole number of the terminal-side connector of the second type changes according to a change in the number of the fuel cells of the fuel cell stack and, therefore, is not constant, when the number of fuel cells of the fuel cell stack is changed, the terminal-side connector has to be modified (e.g., redesigned).

Patent document 1: Japanese Patent Publication 2004-79195.

BRIEF SUMMARY

Problems to be Addressed by Certain Embodiments of the Invention

An object of certain embodiments of the invention is to provide a multi-channel measuring apparatus which can address the drawbacks of the aforementioned conventional apparatus from the viewpoint of space. Also, certain embodiments of the present invention can accommodate to a change in the number of fuel cells of a fuel cell stack.

Means for solving the Problems

Certain embodiments of the present invention may achieve the above object as follows:

(1) A multi-channel measuring apparatus to be connected to a fuel cell stack, comprises a terminal-side connector comprising an N-pole connector whose number of poles is N or an (N+1)-pole connector whose number of poles is (N+1), where N is a voluntary natural number equal to or greater than 2. A plurality of terminal-side connectors is provided.

A number and a combination of N-pole connectors and (N+1)-pole connectors included in the plurality of terminal-side connectors are determined such that a number of all of poles included in the plurality of terminal-side connectors and a number of fuel cells included in the fuel cell stack are equal to each other.

(2) An apparatus according to item (1) above, wherein the following equation is satisfied:

$$N \times M + (N+1) \times P = R \quad \text{(i)}$$

where, M is a number of the N-pole connectors,
P is a number of the (N+1)-pole connectors, and
R is the number of the fuel cells included in the fuel cell stack.

(3) An apparatus according to item (2) above, wherein the number N of poles of the N-pole connector is a maximum number N(max) among numbers N(s) satisfying equation (i).

(4) An apparatus according to any one of items (1)-(3) above, wherein the number of the fuel cells included in the fuel cell stack is equal to or greater than $(N^2 - N)$.

(5) An apparatus according to item (1) above, further comprising a device-side connector. A plurality of device-side connectors are disposed in a row.

Each number of poles of any one of the plurality of device-side connectors is greater than (N+1) and smaller than the number of the fuel cells included in the fuel cell stack.

Any one of the plurality of device-side connectors is connected with at least one of the plurality of terminal-side connectors.

The plurality of device-side connectors includes a one-end device-side connector disposed at a one end of the row and non-one-end device-side connectors other than the one-end device-side connector. Any one of the non-one-end device-side connectors is connected with at least one first terminal-side connector among the plurality of terminal-side connectors. A number and a combination of the N-pole connectors and the (N+1)-pole connectors of the at least one first terminal-side connector with which the any one of the non-one-end device-side connectors is connected are determined such that the any one of the non-one-end device-side connectors and the at least one first terminal-side connector with which the any one of the non-one-end device-side connectors is connected are connected with each other without causing any excess and lack in number of poles.

(6) An apparatus according to item (5) above, wherein the following equation is satisfied:

$$N \times M1 + (N+1) \times P1 = R1 \quad \text{(ii)}$$

where, M1 is a number of the N-pole connectors,
P1 is a number of the (N+1)-pole connectors, and
R1 is a number of the poles of any one of the plurality of non-one-end device-side connectors.

(7) An apparatus according to item (6) above, wherein the number N of poles of the N-pole connector is a maximum number N(max) among numbers N(s) satisfying equation (ii).

(8) An apparatus according to item (5) above, wherein the number of poles of any one of the plurality of the device-side connectors is a multiple of 8.

(9) An apparatus according to item (5) above, wherein a number of poles of all of the plurality of device-side connectors is equal to or greater than the number of all of the fuel cells of the fuel cell stack.

With respect to connection of the any one of the non-one-end device-side connectors with the at least one first terminal-side connector with which the any one of the non-one-end device-side connectors is connected, a number and a combination of the N-pole connectors and the (N+1)-pole connectors of the at least one first terminal-side connector with which the any one of the non-one-end device-side connectors is connected are determined such that the any one of the non-one-end device-side connectors and the at least one first terminal-side connector with which the any one of the non-one-end device-side connectors is connected coincide with each other in number of poles. With respect to connection of the one-end device-side connector with a second terminal-side connector with which the one-end device-side connector is connected, a number and a combination of the N-pole connectors and the (N+1)-pole connectors of the second terminal-side connector with which the one-end device-side connector is connected are determined such that a number of poles of the second terminal-side connector with which the one-end device-side connector is connected coincides with a number obtained by subtracting a number of fuel cells with which the first terminal-side connectors connected with the non-one-end device-side connectors are connected from the number of all of the fuel cells of the fuel cell stack.

Technical Advantages

According to the multi-channel measuring apparatus for connecting to a fuel cell stack according to item (1) above, since a number and a combination of N-pole connectors and (N+1)-pole connectors included in the plurality of terminal-side connectors are determined such that a number of all of poles included in the plurality of terminal-side connectors and a number of fuel cells included in the fuel cell stack are equal to each other, there is no extra in the number of poles of the terminal-side connector. As a result, there is no uselessness compared with the case where there is an extra in the number of poles of the terminal-side connector, and size-down of the multi-channel measuring apparatus can be achieved, which is advantageous from the viewpoint of a space.

Further, when the number of fuel cells of the fuel cell stack changes, the change can be coped with by changing the number and the combination of the N-pole connectors and the (N+1)-pole connectors without newly providing a terminal-side connector other than the N-pole connector and the (N+1)-pole connector. As a result, it is possible to accommodate to a change in the number of fuel cells of the fuel cell stack more easily than the conventional measuring apparatus.

Furthermore, it is possible to detect electric voltages of all fuel cells of the fuel cell stack.

According to the multi-channel measuring apparatus for connecting to a fuel cell stack according to item (2) above, by combining the N-pole connectors and the (N+1)-pole connectors so as to satisfy equation (i) above, it is possible to connect the multi-channel measuring apparatus to the fuel cell stack without causing an excess and a lack in number of poles relative to the number of fuel cells of the fuel cell stack.

According to the multi-channel measuring apparatus for connecting to a fuel cell stack according to item (3) above, since the number N of poles of the N-pole connector is a maximum number N(max) among numbers N(s) satisfying equation (i), one single N-pole connector can have more poles compared with a case where the number N of poles of the N-pole connector is not a maximum number N(max) among numbers N(s) satisfying equation (i). As a result, the labor and time required to connect the terminal-side connectors to the fuel cells of the fuel cell stack can be reduced, compared with a case where the number N of poles of the N-pole connector is not a maximum number N(max) among numbers N(s) satisfying equation (i).

According to the multi-channel measuring apparatus for connecting to a fuel cell stack according to item (4) above, since the number of the fuel cells included in the fuel cell stack is equal to or greater than $(N^2-N)$, it is possible to accommodate to any change in the number of fuel cells when the number of fuel cells of the fuel cell stack changes, by selecting the number and the combination of the N-pole connectors and the (N+1)-pole connectors, without newly providing a terminal-side connector other than the N-pole connector and the (N+1)-pole connector.

According to the multi-channel measuring apparatus for connecting to a fuel cell stack according to item (5) above, since the number and the combination of the N-pole connectors and the (N+1)-pole connectors of the at least one first terminal-side connector with which the any one of the non-one-end device-side connectors is connected are determined such that the any one of the non-one-end device-side connectors and the at least one first terminal-side connector with which the any one of the non-one-end device-side connectors is connected are connected with each other without causing any excess and lack in number of poles, there is no extra in the number of poles, in the any one of the non-one-end device-side connectors and in the at least one first terminal-side connector with which the any one of the non-one-end device-side connectors is connected. As a result, the size of the connector can be reduced and the size of the multi-channel measuring apparatus can be reduced, compared with a case where an excess or a lack in number of poles is provided to the any one of the non-one-end device-side connectors or to the at least one terminal-side connector with which the any one of the non-one-end device-side connectors is connected.

According to the multi-channel measuring apparatus for connecting to a fuel cell stack according to item (6) above, by combining the N-pole connectors and the (N+1)-pole connectors so as to satisfy equation (ii) above, it is possible to connect the any one of the non-one-end device-side connectors and the at least one terminal-side connector with which the any one of the non-one-end device-side connectors is connected without causing no excess and lack in number of poles.

According to the multi-channel measuring apparatus for connecting to a fuel cell stack according to item (7) above, since the number N of poles of the N-pole connector is a maximum number N(max) among numbers N(s) satisfying equation (ii), one single N-pole connector can have more poles compared with a case where the number N of poles of the N-pole connector is not a maximum number N(max) among numbers N(s) satisfying equation (ii). As a result, the labor and time required to connect the terminal-side connectors with the device-side connectors can be reduced, compared with the case where the number N of poles of the N-pole connector is not a maximum number N(max) among numbers N(s) satisfying equation (ii).

According to the multi-channel measuring apparatus for connecting to a fuel cell stack according to item (8) above, since the number of poles of any one of the plurality of the device-side connectors is a multiple of 8, a conventional standard connector whose number of poles is usually a multiple of 8 can be used for the device-side connector.

According to the multi-channel measuring apparatus to be connected to a fuel cell stack according to item (9) above, the following technical advantages can be obtained:

If an excess and a lack are caused in the number of poles in the connection of the each non-one-end device-side connector and the terminal-side connectors, (a) an excess of the number of poles is necessary to be provided to each non-one-end device-side connector, or (b) a relay cable for connecting the excess of the terminal-side connectors to the adjacent device-side connector is necessary to be provided. However, in certain embodiments of the present invention, the terminal-side connectors can be connected to each non-one-end connector without causing an excess and a lack in the number of poles. Therefore, the problems (a) and (b) will most likely not happen.

Further, a number and a combination of the N-pole connectors and the (N+1)-pole connectors of the second terminal-side connector with which the one-end device-side connector is connected are determined such that a number of poles of the second terminal-side connector with which the one-end device-side connector is connected coincides with a number obtained by subtracting a number of fuel cells with which the first terminal-side connectors connected with the non-one-end device-side connectors are connected from the number of all of the fuel cells of the fuel cell stack. As a result, the number of all fuel cells and the number of poles of all terminal-side connectors can be made equal to each other, only by determining the number and the combination of the N-pole connectors and the (N+1)-pole connectors of the second terminal-side connectors with which the one-end device-side connector is connected.

BRIEF DESCRIPTION OF THE DRAWINGS

Referring to the drawings, which form a part of this disclosure:

FIG. 1 is a schematic plan view of a multi-channel measuring apparatus for connecting to a fuel cell stack according to an embodiment of the present invention illustrating terminal-side connectors and wire harnesses and a fuel cell stack to which the multi-channel measuring apparatus is connected;

FIG. 2 is a schematic plan view of the multi-channel measuring apparatus of FIG. 1;

FIG. 3 is a side elevational view of the fuel cell stack viewed in a direction of a fuel cell layering direction, of the multi-channel measuring apparatus of FIG. 1;

FIG. 4 is a cross-sectional view of a portion of a unit fuel cell of the fuel cell stack of the multi-channel measuring apparatus of FIG. 1; and FIG. 5 is a schematic plan view of a multi-channel measuring apparatus of a comparison example (not included in the present invention).

DETAILED DESCRIPTION

A multi-channel measuring apparatus to be connected to a fuel cell stack according to an embodiment of the present invention will be explained below.

First, a fuel cell stack to which the multi-channel measuring apparatus according to the embodiment of the present invention will be explained with reference to FIG. 3 and FIG. 4.

The fuel cell stack 23 to which the multi-channel measuring apparatus 10 according to the embodiment of the present invention is connected is, for example, a solid polymer electrolyte membrane-type fuel cell stack. The fuel cell stack 23 is installed to, for example, a vehicle, but not limited to a vehicle.

The fuel cell stack 23 comprises a layer of a membrane-electrode assembly (MEA: Membrane-Electrode Assembly) and a separator 18. The membrane-electrode assembly comprises an electrolyte membrane 11 made from an ion-exchange membrane, a first electrode (an anode or a fuel electrode) 14 which is made from a catalyst layer disposed at one surface of the electrolyte membrane and a second electrode (a cathode or an air electrode) 17 which is made from a catalyst layer disposed at the other surface of the electrolyte membrane. Diffusion layers 13 and 16 are disposed between the membrane-electrode assembly and the separators 18 on the side of anode and on the side of cathode, respectively.

A fuel cell (a unit fuel cell) 19 is constructed from a layer of the membrane-electrode assembly and the separators 18, and a fuel cell module is constructed from at least one fuel cell. The fuel cell stack 23 is constructed from a layer of fuel cell modules and a terminal, 20, an insulator 21 and an end plate 22 disposed at each of opposite ends of the layer of fuel cell modules, wherein the opposite end plates 22 are fixed by a bolt and nut 25 to a fastening member (e.g., a tension plate 24). The fuel cell stack 23 is housed inside a fuel cell stack casing (not shown) which is an air-tight container.

In the separators 18, a fuel gas passage 27 for supplying fuel gas (i.e., hydrogen) to the anode 14 is formed, and an oxidant gas passage 28 for supplying oxidant gas (i.e., oxygen, usually, air) to the cathode 17 is formed.

Further, in the separators 18, a coolant passage 26 for causing coolant (usually, water) to flow is formed. The coolant passage 26 is provided per each fuel cell 19 or a plurality of fuel cells (for example, a module).

The separator 18 comprises any one of a metal separator, a carbon separator, a conductive synthetic resin separator, a synthetic separator including a metal separator and a synthetic resin frame, and a combination of these separators.

The synthetic separator will be adopted in the explanation below, but is not limited to the synthetic separator, and other separators can be used.

In the case of the synthetic separator, the separator 18 comprises a metal plate 29 having a central portion of the fuel cell where the gas passage 27, 28 are formed and a synthetic resin frame 30 disposed at a peripheral portion of the fuel cell. The MEA is sandwiched between the metal plate 29 of the plus side and the metal plate 29 of the minus side. At the central portion of the fuel cell, the gas passages 27 and 28 are formed at the MEA facing-sides of the metal plates 29. At the peripheral portion of the fuel cell, the electrolyte membrane 11 is sandwiched between the metal plate 29 of the plus side and the metal plate 29 of the minus side. Adhesives seal between the metal plates, between the synthetic resin frame 30 and the metal plate 29, and between the metal plate 29 and the electrolyte membrane 11.

There is an electric voltage difference between the metal plate 29 of the plus side and the metal plate 20 of the minus side opposing each other via the electrolyte membrane 11, and the electric voltage difference is about 1 volt.

There is no electric voltage difference between the metal plate 29 of the plus side of one fuel cell 19 and the metal plate 20 of the minus side of an adjacent fuel cell contacting each other at the central portion of the fuel cell.

Next, the multi-channel measuring apparatus (fuel cell electric voltage measuring apparatus) 10 will be explained.

As illustrated in FIG. 2, the multi-channel measuring apparatus 10 according to the embodiment of the present invention includes a terminal-side connector 40 and a device-side connector 50 to be connected to the terminal-side connector 40. The multi-channel measuring apparatus 10 according to the embodiment of the present invention may further include ECU (Electronics Control Unit, i.e., an electronics control device) 60 and a wire harness 70.

The terminal-side connector 40 comprises an N-pole connector 41 whose number of poles is N or an (N+1)-pole connector 42 whose number of poles is (N+1), where N is a voluntary natural number equal to or greater than 2. A plurality of terminal-side connectors 40 are provided.

As illustrated in FIG. 1, the multi-channel measuring apparatus 10 is connected to the fuel cell stack 23 at the terminal-side connectors 40 such that the number of all of the poles of all of the terminal-side connectors does not cause an excess or lack relative to the number of all of the fuel cells of the fuel cell stack 23. The number and the combination of the N-pole connectors 41 and the (N+1)-pole connectors 42 included in all of the terminal-side connectors 40 are determined such that the number of all of the poles included in all of the terminal-side connectors 40 and the number of all of the fuel cells 19 included in the fuel cell stack 23 are equal to each other. The embodiment shown is the case where N is equal to 5. However, N is not limited to 5, and can be a natural number other than 5, for example, 2, 3, 4, 6, and 7, etc.

The N-pole connector 41 and the (N+1)-pole connector 42 have a housing 43 and a terminal 44. The number of terminals 44 of the N-pole connector 41 is N, and the number of terminals 44 of the (N+1)-pole connector 41 is (N+1). The housing 43 of the N-pole connector 41 holds the N(s) terminals 44, and the housing 43 of the (N+1)-pole connector 42 holds the (N+1)(s) terminals 44.

The housing 43 is non-conductive and is made from, for example, synthetic resin. The terminal 44 is conductive and is made from metal (including a metal-plated member). The plurality of terminals 44 is disposed in the housing 43 such that the terminals 44 are parallel to each other and in a row in a direction parallel to a fuel cell layering direction A of the fuel cells 19 of the fuel cell stack 23. Each terminal 44 is contacted to the metal plate 29 of a polarity of either one of plus and minus of the fuel cell 19 and detects an electric voltage of the fuel cell 19. More particularly, when one terminal 44 of one fuel cell 19 is connected to the metal plate 29 of plus in polarity of one fuel cell 19, an adjacent terminal 44 is connected to the metal plate 29 of plus in polarity of an adjacent fuel cell 19.

As illustrated in FIG. 2, the device-side connectors 50 are provided to the ECU 60. A plurality of (three in the embodiment shown) device-side connectors 50 are disposed in a row. The number of poles of any one of the device-side connectors 50 is greater than (N+1) and smaller than the number of the fuel cells 19 included in the fuel cell stack 23. The numbers of poles of the device-side connectors 50 may be equal to each other or different from each other. A conventional, standard connector is used for any one of the device-side connectors 50, and the number of poles of any one of the device-side connectors 50 is, for example, a multiple of 8, but may be other than a multiple of 8. Any one of the device-side connectors 50 is connected to at least one terminal-side connector 40 by a wire harness 70.

The wire harnesses 70 connected to each device-side connector 50 are bundled per the wire harnesses 70 connected to each device-side connector 50 and construct a cable 71. The wire harnesses 70 penetrate the stack casing at the cable 71. The terminal-side connectors 40 are inside the stack casing, and the device-side connectors 50 and the ECU 60 are outside the stack casing.

The plurality of device-side connectors 50 include a one-end device-side connector 50a disposed at a one end of the row and non-one-end device-side connectors 50b other than the one-end device-side connector 50a. Any one of the non-one-end device-side connectors 50b and at least one first terminal-side connector 40 with which the any one of non-one-end device-side connectors 50b is connected are connected with each other without causing any excess and lack in number of poles. The number and the combination of the N-pole connectors 41 and the (N+1)-pole connectors 42 of the at least one first terminal-side connector 40 with which the any one of the non-one-end device-side connectors 50b is connected are determined such that the any one of the non-one-end device-side connectors 50b and the at least one first terminal-side connector 40, with which the any one of the non-one-end device-side connectors 50b is connected, are connected with each other without causing any excess and lack in number of poles.

The number of poles of the one-end device-side connector 50a may be larger than the number of poles of the at least one second terminal-side connector 40 with which the one-end device-side connector 50a is connected or may be equal to the number of poles of the at least one second terminal-side connector 40 with which the one-end device-side connector 50a is connected. The reason why the number of poles of the one-end device-side connector 50a may be larger than the number of poles of the at least one second terminal-side connector 40, with which the one-end device-side connector 50a is connected, is that even though an excess in the number of poles happens in the one-end device-side connector 50a, an excess in the number of poles does not happen in the non-one-end device-side connectors 50b, so that an increase in a size of the device-side connector 50 (an increase in a size of the multi-channel measuring apparatus 10) is of a negligible order.

Next, it will be explained how to connect the terminal-side connectors 40 to the fuel cells 19 of the fuel cell stack 23 without causing an excess and a lack in the number of poles relative to the number of fuel cells 19, and how to connect the terminal-side connectors 40 with any one of the non-one-end device-side connectors 50b.

The number and the combination of the N-pole connectors 41 and the (N+1)-pole connectors 42 are determined such that the following equation is satisfied:

$$N \times M + (N+1) \times P = R \qquad (i)$$

where, M is a number of the N-pole connectors 41,
P is a number of the (N+1)-pole connectors 42, and
R is the number of the fuel cells 19 included in the fuel cell stack 23.

Preferably, the number N of poles of the N-pole connector is a maximum number N(max) among numbers N(s) satisfying equation (i). This is because the labor and time required to connect the terminal-side connectors 40 to the fuel cells 19 of the fuel cell stack 23 can be reduced by making the number of the poles (the number of terminals) selected large.

Further, the number and the combination of the N-pole connectors 41 and the (N+1)-pole connectors 42 are determined such that the following equation is satisfied:

$$N \times M1 + (N+1) \times P1 = R1 \qquad (ii)$$

where, M1 is a number of the N-pole connectors 41,
P1 is a number of the (N+1)-pole connectors 42, and
R1 is a number of the poles of any one of the plurality of non-one-end device-side connectors 50b.

Preferably, the number N of poles of the N-pole connector is a maximum number N(max) among numbers N(s) satisfying equation (ii). This is because a labor and time required to connect the terminal-side connectors 40 with the non-one-end device-side connectors 50*b* can be reduced by making the number of the poles (the number of terminals) selected large.

In a case where the maximum number N satisfying equation (i) and the maximum number N satisfying equation (ii) differ from each other, the maximum number N satisfying equations (i) and (ii) is preferable to be selected. This is because it is possible to connect the terminal-side connectors 40 with the fuel cell 19 without causing any excess and lack in the number of poles relative to the number of the fuel cells 19, and it is possible to connect the terminal-side connectors 40 with any one of the non-one-end device-side connectors 50*b* without causing any excess and lack in the number of poles. Further, it may be possible to reduce the labor and time required to connect the terminal-side connectors 40 with the fuel cells 19 and to connect the terminal-side connectors 40 with any one of the non-one-end device-side connectors 50*b*.

A detailed example E for connecting the fuel cell stack 23 and the ECU 60 using the terminal-side connectors 40 and the device-side connectors 50 will be explained.

The number of poles of all of the plurality of device-side connectors 50 is equal to or greater than the number of all of the fuel cells 19 of the fuel cell stack 23.

With respect to connection of the any one of the non-one-end device-side connectors 50*b* with the at least one first terminal-side connector 40 with which the any one of the non-one-end device-side connectors 50*b* is connected, the number and the combination of the N-pole connectors 41 and the (N+1)-pole connectors 42 of the at least one first terminal-side connector 40 with which the any one of the non-one-end device-side connectors 50*b* is connected are determined such that the any one of the non-one-end device-side connectors 50*b* and the at least one first terminal-side connector 40 with which the any one of the non-one-end device-side connectors 50*b* is connected coincide with each other in number of poles.

With respect to connection of the one-end device-side connector 50*a* with the at least one second terminal-side connector 40 with which the one-end device-side connector 50*a* is connected, the number and the combination of the N-pole connectors 41 and the (N+1)-pole connectors 42 of the at least one second terminal-side connector 40 with which the one-end device-side connector 50*a* is connected are determined such that the number of poles of the at least one second terminal-side connector 40 with which the one-end device-side connector 50*a* is connected coincides with the number obtained by subtracting the number of fuel cells 19 with which the first terminal-side connectors 40 connected with the non-one-end device-side connectors 50*b* are connected from the number of all of the fuel cells 19 of the fuel cell stack 23.

A case where the maximum N(max) among the N(s) satisfying the above equations (i) and (ii) is, for example, 5 will be explained. When N is 5, (N+1) is 6. By determining the number and the combination of the two types of connectors, i.e., the N-pole connector 41 and the (N+1)-pole connector 42, the following number of the fuel cells 19 of the fuel cell stack 23 and the following number of poles of the any one of the non-one-end device-side connectors 50*b* can be accommodated:

$5 \times 1 + (5+1) \times 0 = 5$,
$5 \times 0 + (5+1) \times 1 = 6$,
$5 \times 2 + (5+1) \times 0 = 10$,
$5 \times 1 + (5+1) \times 1 = 11$,
$5 \times 0 + (5+1) \times 2 = 12$,
$5 \times 3 + (5+1) \times 0 = 15$,
$5 \times 2 + (5+1) \times 1 = 16$,
$5 \times 1 + (5+1) \times 2 = 17$,
$5 \times 0 + (5+1) \times 3 = 18$,
$5 \times 4 + (5+1) \times 0 = 20$,
$5 \times 3 + (5+1) \times 1 = 21$,
$5 \times 2 + (5+1) \times 2 = 22$,
$5 \times 1 + (5+1) \times 3 = 23$,
$5 \times 0 + (5+1) \times 4 = 24$,
$5 \times 5 + (5+1) \times 0 = 25$,
$5 \times 4 + (5+1) \times 1 = 26$,
$5 \times 3 + (5+1) \times 2 = 27$,
$5 \times 2 + (5+1) \times 3 = 28$,
$5 \times 1 + (5+1) \times 4 = 29$,
$5 \times 0 + (5+1) \times 5 = 30$,
$5 \times 5 + (5+1) \times 5 = 31$,
$5 \times 4 + (5+1) \times 2 = 32$,
$5 \times 3 + (5+1) \times 3 = 33$,
. . .

From above, it can be understood that, in the case where N is 5, any number of the fuel cells 19 of the fuel cell stack 23 and any number of poles of the any one of the non-one-end device-side connectors 50*b* can be coped with so long as the numbers are equal to or greater than 20 (so long as the numbers are a natural number of $N^2-N$). Even with the case where the number of the fuel cells 19 of the fuel cell stack 23 and the number of poles of the any one of the non-one-end device-side connectors 50*b* are smaller than 20, the numbers can be coped with so long as the numbers are any one of 5, 6, 10, 11, 12, 15, 16, 17 and 18.

Accordingly, in the case where the number of the fuel cells 19 of the fuel cell stack 23 and the number of poles of the any one of the non-one-end device-side connectors 50*b* are equal to or greater than $(N^2-N)$, any natural number can be coped with. Further, even with the case where the number of the fuel cells 19 of the fuel cell stack 23 and the number of poles of the any one of the non-one-end device-side connectors 50*b* are smaller than $(N^2-N)$, a plurality of (e.g., about a half of) natural numbers can be coped with.

Next, effects and technical advantages of the embodiment of the present invention will be explained.

According to the embodiment of the present invention, since the number and the combination of the N-pole connectors 41 and the (N+1)-pole connectors 42 are determined such that the number of all of poles included in the plurality of terminal-side connectors 40 and the number of fuel cells 19 included in the fuel cell stack 23 are equal to each other, there is no extra in the number of poles of the terminal-side connector 40. As a result, there is no uselessness compared with the case where there is an extra in the number of poles of the terminal-side connector 40, and size-down of the multi-channel measuring apparatus 10 can be achieved, which is advantageous from the viewpoint of a space.

Further, when the number of fuel cells 10 of the fuel cell stack 23 changes, the change can be coped with by changing the number and the combination of the N-pole connectors 41 and the (N+1)-pole connectors 42 without newly providing a terminal-side connector other than the N-pole connector and the (N+1)-pole connector. As a result, it is possible to accommodate to a change in the number of fuel cells 19 of the fuel cell stack 23 more easily than the conventional measuring apparatus.

By combining the N-pole connectors 41 and the (N+1)-pole connectors 42 so as to satisfy equation (i) above, it is possible to connect the multi-channel measuring apparatus 10 to the fuel cell stack 23 without causing an excess and a lack in number of poles relative to the number of fuel cells 19 of the fuel cell stack 23.

In the case where the number N of poles of the N-pole connector 41 is a maximum number N(max) among numbers N(s) satisfying equation (i) above, one single N-pole connector 41 can have more poles compared with a case where the number N of poles of the N-pole connector is not a maximum number N(max) among numbers N(s) satisfying equation (i). As a result, the labor and time required to connect the terminal-side connectors 40 to the fuel cells 19 of the fuel cell stack 23 can be reduced, compared with the case where the number N of poles of the N-pole connector is not a maximum number N(max) among numbers N(s) satisfying equation (i).

Since the number of the fuel cells 19 included in the fuel cell stack 23 is equal to or greater than $(N^2-N)$, it is possible to accommodate to any change in the number of fuel cells 19 even when the number of fuel cells 10 of the fuel cell stack 23 changes, by selecting the number and the combination of the N-pole connectors 41 and the (N+1)-pole connectors 42, without newly providing a terminal-side connector other than the N-pole connector and the (N+1)-pole connector. As a result, the terminal-side connector 40 to be prepared is only two types including the N-pole connector 41 and the (N+1)-pole connector 42. Therefore, the number or parts can be reduced compared with a case where the number of types of the connectors to be prepared is equal to or greater than 3.

Since the number and the combination of the N-pole connectors 41 and the (N+1)-pole connectors 42 of the at least one first terminal-side connector 40 with which the any one of the non-one-end device-side connectors 50b is connected are determined such that the any one of the non-one-end device-side connectors 50b and the at least one first terminal-side connector 40 with which the any one of the non-one-end device-side connectors 50b is connected are connected with each other without causing any excess and lack in number of poles, there is no extra in the number of poles, in the any one of the non-one-end device-side connectors 50b and in the at least one first terminal-side connector 40 with which the any one of the non-one-end device-side connectors 50b is connected. As a result, the size of the connector can be reduced and the size of the multi-channel measuring apparatus 10 can be reduced, compared with a case where an excess or a lack in number of poles is provided to the any one of the non-one-end device-side connectors 50b or to the at least one terminal-side connector 40 with which the any one of the non-one-end device-side connectors 50b is connected.

By combining the N-pole connectors 41 and the (N+1)-pole connectors 42 so as to satisfy equation (ii) above, it is possible to connect the any one of the non-one-end device-side connectors 50b and the at least one first terminal-side connector 40, with which the any one of the non-one-end device-side connectors 50b is connected, without causing excess and lack in number of poles.

Since the number N of poles of the N-pole connector 41 is a maximum number N(max) among numbers N(s) satisfying equation (ii), one single N-pole connector 41 can have more poles compared with a case where the number N of poles of the N-pole connector is not a maximum number N(max) among numbers N(s) satisfying equation (ii). As a result, the labor and time required to connect the terminal-side connectors 40 with the device-side connectors 50 can be reduced, compared with the case where the number N of poles of the N-pole connector is not a maximum number N(max) among numbers N(s) satisfying equation (ii).

Since the number of poles of any one of the plurality of the device-side connectors 50 is a multiple of 8, a conventional standard connector whose number of poles is usually a multiple of 8 can be used for the device-side connector 50.

In a case where the number of poles of the one-end device-side connector 50a is larger than the number of poles of the at least one second terminal-side connector 40 with which the one-end device-side connector 50a is connected, even when the number of the fuel cells 19 of the fuel cell stack 23 changes to increase, the increase in the number of fuel cells 19 can be coped with by the one-end device-side connector 50a without newly providing a device-side connector 50, if an increase in the number of the fuel cells 19 is smaller than a number obtained by subtracting a number of poles of the at least one second terminal-side connector 40, with which the one-end device side connector 50a is connected, from the number of poles of the one-end device side connector 50a.

In a case where the number of poles of the one-end device-side connector 50a is equal to the number of poles of the at least one second terminal-side connector 40 with which the one-end device-side connector 50a is connected, the multi-channel measuring apparatus 10 can be made small, compared with a case where the number of poles of the one-end device-side connector 50a is not equal to the number of poles of the at least one second terminal-side connector 40 with which the one-end device-side connector 50a is connected.

Effects and technical advantages of the above-described example E are as follows:

If an excess and a lack of number of poles are caused in the number of poles in the connection of each non-one-end device-side connector and the terminal-side connectors, (a) an excess of the number of poles is necessary to be provided to each non-one-end device-side connector, or (b) as shown in FIG. 5 of the comparison example, a relay cable 100 for connecting the excess of the terminal-side connectors to the adjacent device-side connector is necessary to be provided. However, in certain embodiments of the present invention, the terminal-side connectors 40 can be connected to each non-one-end connector 50b without causing an excess and a lack in the number of poles. Therefore, the problems (a) and (b) will not happen. In the comparison example of FIG. 5, the number of poles of each terminal-side connector is 5, and in order to connect the terminal-side connectors to the fuel cells without causing an excess or lack in the number of poles, a terminal-side connector having the number of poles other than 5 (in the example shown, 3) is provided. Further, to make the correspondence between the parts of certain embodiments of the present invention and the parts of the comparison example easy to understand, the parts of the comparison example corresponding to the parts of certain embodiments of the present invention are denoted with the same reference numerals but with dash (') as those of certain embodiments of the present invention. By denoting the reference numerals, explanation about structures of the comparison example is omitted.

Further, the number and the combination of the N-pole connectors 41 and the (N+1)-pole connectors 42 of the second terminal-side connectors 40 with which the one-end device-side connector 50a is connected are determined such that the number of poles of the second terminal-side connectors 40 with which the one-end device-side connector 50a is connected coincides with a number obtained by subtracting the number of fuel cells 19 with which the first terminal-side connectors 40 connected with the non-one-end device-side connectors 50b are connected from the number of all of the fuel cells 19 of the fuel cell stack 23. As a result, the number of all fuel cells 19 and the number of poles of all terminal-side connectors 40 can be made equal to each other, only by determining the number and the combination of the N-pole connectors 41 and the (N+1)-pole connectors 42 of the second terminal-side connectors 40 with which the one-end device-side connector 50a is connected.

The examples described herein are merely illustrative, as numerous other embodiments may be implemented without departing from the spirit and scope of the exemplary embodiments of the present invention. Moreover, while certain features of the invention may be shown on only certain embodiments or configurations, these features may be exchanged, added, and removed from and between the various embodiments or configurations while remaining within the scope of the invention. Likewise, methods described and disclosed may also be performed in various sequences, with some or all of the disclosed steps being performed in a different order than described while still remaining within the spirit and scope of the present invention.

The invention claimed is:

1. A multi-channel measuring apparatus for connection to a fuel cell stack, comprising:
a terminal-side connector comprising an N-pole connector whose number of poles is N or an (N+1)-pole connector whose number of poles is (N+1), where N is a voluntary natural number equal to or greater than 2, a plurality of terminal-side connectors being provided, wherein a number and a combination of N-pole connectors and (N+1)-pole connectors included in the plurality of terminal-side connectors are determined such that a number of all of poles included in the plurality of terminal-side connectors and a number of fuel cells included in the fuel cell stack are equal to each other.

2. An apparatus according to claim 1, wherein the following equation is satisfied, $$N \times M + (N+1) \times P = R \quad \text{(i)}$$

where, M is a number of the N-pole connectors,
P is a number of the (N+1)-pole connectors, and
R is the number of the fuel cells included in the fuel cell stack.

3. An apparatus according to claim 2, wherein the number N of poles of the N-pole connector is a maximum number N(max) among numbers N(s) satisfying equation (i).

4. An apparatus according to claim 1, wherein the number of the fuel cells included in the fuel cell stack is equal to or greater than $(N^2-N)$.

5. An apparatus according to claim 1, further comprising a device-side connector, a plurality of device-side connectors being disposed in a row,
a number of poles of any one of the plurality of device-side connectors being greater than (N+1) and smaller than the number of the fuel cells included in the fuel cell stack,
any one of the plurality of device-side connectors being connected with at least one of the plurality of terminal-side connectors,
wherein the plurality of device-side connectors includes a one-end device-side connector disposed at a one end of the row and non-one-end device-side connectors other than the one-end device-side connector, any one of the non-one-end device-side connectors being connected with at least one first terminal-side connector among the plurality of terminal-side connectors, a number and a combination of the N-pole connectors and the (N+1)-pole connectors of the at least one first terminal-side connector with which the any one of the non-one-end device-side connectors is connected are determined such that the any one of the non-one-end device-side connectors and the at least one first terminal-side connector with which the any one of the non-one-end device-side connectors is connected are connected with each other without causing any excess and lack in number of poles.

6. An apparatus according to claim 5, wherein the following equation is satisfied:

$$N \times M1 + (N+1) \times P1 = R1 \quad \text{(ii)}$$

where, M1 is a number of the N-pole connectors,
P1 is a number of the (N+1)-pole connectors, and
R1 is a number of the poles of any one of the plurality of non-one-end device-side connectors.

7. A measuring apparatus according to claim 6, wherein the number N of poles of the N-pole connector is a maximum number N(max) among numbers N(s) satisfying equation (ii).

8. An apparatus according to claim 5, wherein the number of poles of any one of the plurality of the device-side connectors is a multiple of 8.

9. An apparatus according to claim 5, wherein a number of poles of all of the plurality of device-side connecters is equal to or greater than the number of all of the fuel cells of the fuel cell stack,
wherein with respect to connection of the any one of the non-one-end device-side connectors with the at least one first terminal-side connector with which the any one of the non-one-end device-side connectors is connected, a number and a combination of the N-pole connectors and the (N+1)-pole connectors of the at least one first terminal-side connector with which the any one of the non-one-end device-side connectors is connected are determined such that the any one of the non-one-end device-side connectors and the at least one first terminal-side connector with which the any one of the non-one-end device-side connectors is connected coincide with each other in number of poles, and
with respect to connection of the one-end device-side connector with a second terminal-side connector with which the one-end device-side connector is connected, a number and a combination of the N-pole connectors and the (N+1)-pole connectors of the second terminal-side connector with which the one-end device-side connector is connected are determined such that a number of poles of the second terminal-side connector with which the one-end device-side connector is connected coincides with a number obtained by subtracting a number of fuel cells with which the first terminal-side connectors connected with the non-one-end device-side connectors are connected from the number of all of the fuel cells of the fuel cell stack.

* * * * *